United States Patent
Aleksic et al.

(10) Patent No.: US 10,529,322 B2
(45) Date of Patent: Jan. 7, 2020

(54) SEMANTIC MODEL FOR TAGGING OF WORD LATTICES

(71) Applicant: Google LLC, Mountain View, CA (US)

(72) Inventors: Petar Aleksic, Jersey City, NJ (US); Michael D. Riley, New York, NY (US); Pedro J. Moreno Mengibar, Jersey City, NJ (US); Leonid Velikovich, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/681,801

(22) Filed: Aug. 21, 2017

(65) Prior Publication Data

US 2018/0366112 A1    Dec. 20, 2018

Related U.S. Application Data

(60) Provisional application No. 62/519,970, filed on Jun. 15, 2017.

(51) Int. Cl.
  *G10L 15/04* (2013.01)
  *G10L 15/18* (2013.01)
  (Continued)

(52) U.S. Cl.
  CPC ...... *G10L 15/1815* (2013.01); *G06F 17/2775* (2013.01); *G10L 15/197* (2013.01);
  (Continued)

(58) Field of Classification Search
  None
  See application file for complete search history.

(56) References Cited

U.S. PATENT DOCUMENTS 6,374,217 B1 * 4/2002 Bellegarda .......... G10L 15/1815
                                                    704/240
7,191,130 B1 * 3/2007 Leggetter ................ G10L 15/22
                                                    704/251

(Continued)

OTHER PUBLICATIONS

Deoras et al., "Joint Discriminative Decoding of Words and Semantic Tags for Spoken Language Understanding", IEEE Transactions on Audio, Speech, and Language Processing, vol. 21, No. 8, pp. 1612-1621, Aug. 2013.*

(Continued)

*Primary Examiner* — Richard Z Zhu
(74) *Attorney, Agent, or Firm* — Fish & Richardson P.C.

(57) ABSTRACT

Methods, systems, and apparatus, including computer programs encoded on a computer storage medium, for tagging during speech recognition. A word lattice that indicates probabilities for sequences of words in an utterance is obtained. A conditional probability transducer that indicates a frequency that sequences of both the words and semantic tags for the words appear is obtained. The word lattice and the conditional probability transducer are composed to construct a word lattice that indicates probabilities for sequences of both the words in the utterance and the semantic tags for the words. The word lattice that indicates probabilities for sequences of both the words in the utterance and the semantic tags for the words is used to generate a transcription that includes the words in the utterance and the semantic tags for the words.

19 Claims, 7 Drawing Sheets

(51) Int. Cl.
  *G10L 15/22* (2006.01)
  *G10L 15/197* (2013.01)
  *G06F 17/27* (2006.01)
  *G10L 15/14* (2006.01)
  *G10L 15/193* (2013.01)

(52) U.S. Cl.
  CPC .............. *G10L 15/22* (2013.01); *G10L 15/14* (2013.01); *G10L 15/1822* (2013.01); *G10L 15/193* (2013.01)

(56) References Cited

U.S. PATENT DOCUMENTS

| | | | | |
|---|---|---|---|---|
| 7,630,892 | B2* | 12/2009 | Wu | G06F 17/2705 704/224 |
| 8,880,399 | B2* | 11/2014 | Hagen | G09B 19/06 704/236 |
| 9,473,637 | B1* | 10/2016 | Venkatapathy | H04M 3/5175 |
| 2005/0055209 | A1* | 3/2005 | Epstein | G10L 15/1815 704/255 |
| 2006/0149544 | A1* | 7/2006 | Hakkani-Tur | G10L 15/22 704/236 |
| 2013/0346066 | A1* | 12/2013 | Deoras | G06F 17/27 704/9 |
| 2015/0279360 | A1* | 10/2015 | Mengibar | G10L 15/18 704/257 |
| 2015/0287410 | A1* | 10/2015 | Mengibar | G10L 17/005 704/246 |
| 2015/0370234 | A1* | 12/2015 | Lehane | G01R 13/0272 326/46 |

OTHER PUBLICATIONS

Aleksic et al. "Bringing contextual information to google speech recognition," INTERSPEECH, 2015, 5 pages.
Allauzen et al. "Efficient algorithms for testing the twins property," Journal of Automata, Languages and Cominatorics, 8(2), Apr. 1, 2003, 29 pages.
Allauzen et al. "OpenFst: A General and efficient weighted finite-state transducer library," Proceedings of the Ninth International Conference on Implementation and Application of Automata, vol. 4783 of Lecture Notes in Computer Science, 2007, 12 pages.
Bollacker et al. "Freebase: a collaboratively created graph database for structuring human knowledge," Proceedings of the 2008 ACM SIGMOD international Conference on Management of data. ACM, Jun. 9, 2008, 3 pages.
Chen et al. "Pronunciation and silence probability modeling for asr," Proceedings of INTERSPEECH, 2015, 5 pages.
Cohn et al. "Efficient inference in large conditional random fields," European Conference on Machine Learning. Springer vol. 6, Sep. 18, 2006, 12 pages.
Cucerzan. "Large-scale names entity disambiguation based on Wikipedia data," 2007, 9 pages.
Deoras et al. "Joint decoding for speech recognition and semantic tagging," INTERSPEECH 2012, 4 pages.
Fiscus et al. "Results of the 2006 spoken term detection evaluation," Proc. SIGIR. Citeseer, vol. 7, Jul. 2007, 7 pages.
Fosler et al. "Automatic learning of word pronunciation from data," Proceedings of the International Conference on Spoken Language Processing, Oct. 1996, 2 pages.
Hahn et al. "Comparing stochastic approaches to spoken language understanding in multiple languages," IEEE Transaction on Audio, Speech, and Language Processing, 19(6), Aug. 2011, 17 pages.
Hakkani-Tur et al. "Beyond asr 1-best: Using word confusion networks in spoken language understanding," Computer Speech & Language 20(4) Oct. 31, 2006, 20 pages.
Lafferty et al. "Conditional random fields: Probabilistic models for segmenting and labeling sequence data," Proceedings of the eighteenth international conference on machine learning, Jun. 28, 2001, 10 pages.
Mohri et al. "Weighted finite-state transducers in speech recognition," University of Pennsylvania Scholarly Commons, Departmental Papers, Oct. 2001, 28 pages.
Mohri. "Weighted automata algorithms," Handbook of weighted automata pp. 213-254. Springer 2009, 45 pages.
Nadeau et al. "A survey of names entity recognition and classification," Lingvisticae Investigations, 30(1) Jan. 1, 2007, 20 pages.
Nebhi. "Named entity disambiguation using freebase and syntactic parsing," Proceedings of the First International Conference on Linked Data for Information Extraction—vol. 1057, Oct. 21, 2013, 7 pages.
Ng et al. "On discriminative vs. generative classifiers: A comparison of logistic regression and naïve bayes," Advances in Neural Information Processing Systems, vol. 14, 2002, 8 pages.
Ratinov et al. "Design challenges and misconceptions in named entity recognition," Proceedings of the Thirteenth Conference on Computational Natural Language Learning. ACL Jun. 4, 2009, 9 pages.
Raymond et al. "On the use of finite state transducers for semantic interpretation," Speech Communication, 48(3), Apr. 30, 2006, 17 pages.
Ritter et al. "Named entity recognition in tweets: an experimental study," Proceedings of the Conference on Empirical Methods in Natural Language Processing, ACL Jul. 27, 2011, 11 pages.
Roark et al. "The opengrm open-source finite-state grammar software libraries," Proceedings of the ACL 2012 System Demonstrations. ACL, Jul. 10, 2012, 6 pages.
Servan et al. "Conceptual decoding from word lattices: application to the spoken dialogue corpus media," The Ninth International Conference on Spoken Language Processing, (Interspeech 2006), Sep. 2006, 5 pages.
Siniscalchi et al. "A study on lattice rescoring with knowledge scores for automatic speech recognition," INTERSPEECH 2006, 4 pages.
Stolcke. "Entropy-based pruning of backoff language models," arXiv preprint cs/0006025, Jun. 11, 2000, 5 pages.
Wu et al. "Encoding linear models as weighted finite-state transducers," INTERSPEECH 2014, 5 pages.
Xu et al. "Semantic understanding by combining extended cfg parser with hmm model," SLT, Citeseer, Dec. 12, 2010, 6 pages.
Zheng et al. "Entity disambiguation with freebase," Proceedings of the 2012 IEEE/WIC/ACM International Joint Conference on Web Intelligence and Intelligent Agent Technology—vol. 1, Dec. 4, 2012, 8 pages.

* cited by examiner

SEMANTIC MODEL FOR TAGGING OF WORD LATTICES

CROSS-REFERENCE TO RELATED APPLICATION

This application claims priority to U.S. Provisional Application No. 62/519,970, filed on Jun. 15, 2017. The disclosure of the foregoing application is incorporated herein by reference in its entirety.

TECHNICAL FIELD

This document generally relates to speech recognition.

BACKGROUND

Automated speech recognition may be used to recognize words spoken by users. For example, a voice command enabled device may generate a transcription of what a user says and then determine whether the transcription includes any words that correspond to a voice command.

SUMMARY

This specification describes techniques, methods, systems, and other mechanisms for tagging words during speech recognition. In general, a semantic tagger may insert tags into a word lattice, such as a word lattice produced by a real-time large vocabulary speech recognition system. For example, the phrase "San Francisco" may appear in a path of a word lattice and tagged with metadata of "<cities>" before "San" and metadata of "</cities>" after "Francisco."

Benefits of such a tagger may include the ability to rescore speech recognition hypotheses based on this metadata which may lead to better accuracy in automated speech recognition, as well as providing rich annotations to clients downstream which may lead to additional functionality of the clients using the annotations. The tagging may be performed for spoken search queries and voice commands, and tagging may be useful for building an intelligent assistant. For example, the tags may indicate which words correspond to triggers for commands and which words correspond to user provided parameters for commands.

The tagging may be performed by distilling a pre-existing very large named entity disambiguation (NED) model into a lightweight tagger. This may be accomplished by constructing a joint distribution of tagged n-grams from a supervised training corpus and then deriving a conditional distribution for a given lattice. The tagging may take a generative approach, modeling a joint distribution of n-grams with semantic tags and later deriving a conditional distribution for a given lattice. In another example, tagging may be performed by using a conditional distribution of tagged n-grams constructed directly from a supervised training corpus.

In a general aspect, a method for obtaining, from an automated speech recognizer, a word lattice that indicates probabilities for sequences of words in an utterance, obtaining a conditional probability transducer that indicates a frequency that sequences of both the words and semantic tags for the words appear, composing the word lattice and the conditional probability transducer to construct a word lattice that indicates probabilities for sequences of both the words in the utterance and the semantic tags for the words, and using the word lattice that indicates probabilities for sequences of both the words in the utterance and the semantic tags for the words to generate a transcription that includes the words in the utterance and the semantic tags for the words.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For instance obtaining, from an automated speech recognizer, a word lattice that indicates probabilities for sequences of words in an utterance may include providing an utterance to the automated speech recognizer that does not semantically tag words and receiving, from the automated speech recognizer, the word lattice that indicates probabilities for sequences of words in an utterance, where the word lattice does not include semantic tags for words in the word lattice. Obtaining a conditional probability transducer that indicates a frequency that sequences of both the words and semantic tags for the words appear may include obtaining the conditional probability transducer from a language model that is trained on a corpus of text that includes sequences of words and semantic tags for the words.

Obtaining a conditional probability transducer that indicates a frequency that sequences of both the words and semantic tags for the words appear may include obtaining joint probabilities for sequences of the words and the semantic tags for the words, obtaining marginal probabilities for sequences of the words, and obtaining the condition probability transducer from the joint probabilities and the marginal probabilities. Obtaining joint probabilities for sequences of the words and the semantic tags for the words may include obtaining joint probabilities from a language model that includes joint probabilities corresponding to a corpus of text that includes sequences of words and semantic tags for the words. Obtaining joint probabilities from a language model that includes joint probabilities corresponding to a corpus of text that includes sequences of words and semantic tags for the words may include generating an unweighted word lattice with semantic tags from the word lattice that indicates probabilities for sequences of words in an utterance and the semantic tags in the language model and composing the unweighted word lattice with semantic tags and the language model that includes joint probabilities corresponding to a corpus of text that includes sequences of words and semantic tags for the words.

Obtaining marginal probabilities for sequences of the words and the semantic tags for the words may include obtaining marginal probabilities from the joint probabilities. Obtaining marginal probabilities from the joint probabilities may include performing max-normalization so that the marginal probabilities represent pseudo-probabilities based on best tagging for a sentence. Obtaining the condition probability transducer from the joint probabilities and the marginal probabilities may include composing the joint probability and the inverse of the marginal probability. Obtaining the condition probability transducer from the joint probabilities and the marginal probabilities may include performing beam pruning to remove paths that do not satisfy a threshold conditional probability. Using the word lattice that indicates probabilities for sequences of both the words in the utterance and the semantic tags for the words to generate a transcription that includes the words in the utterance and the semantic tags for the words may include biasing the probability of a path in the word lattice based at least on a semantic tag in the path, selecting the path in the word lattice from among other paths in the word lattice based at least on the biased probability of the path, and generating a transcription from the selected path in the word lattice.

Particular implementations can, in certain instances, realize one or more of the following advantages. A first advantage of particular implementations may be the ability to start with a very large model (or annotated training corpus) and scale down to an arbitrarily small size that provides fast tagging speed, which may make the approach practical for real-time speech recognition.

A second advantage of particular implementations may be handling of ambiguity. In a scenario of automatic speech recognition (ASR) word lattice rescoring, tagging a highly ambiguous sentence may split the sentence into numerous alternate tagged paths, each one improbable in an absolute sense. This fragmentation may hurt the entire hypothesis' chance of being chosen over a non-ambiguous hypothesis. Particular implementations may address this problem by supporting "max-normalization," where probabilities are scaled such that the best tagging gets a "probability" of one, preserving n-best order. Additionally or alternatively beam pruning of improbable tags may be supported to avoid cluttering the lattice, which may lead to faster automated speech recognition as the lattice is smaller.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
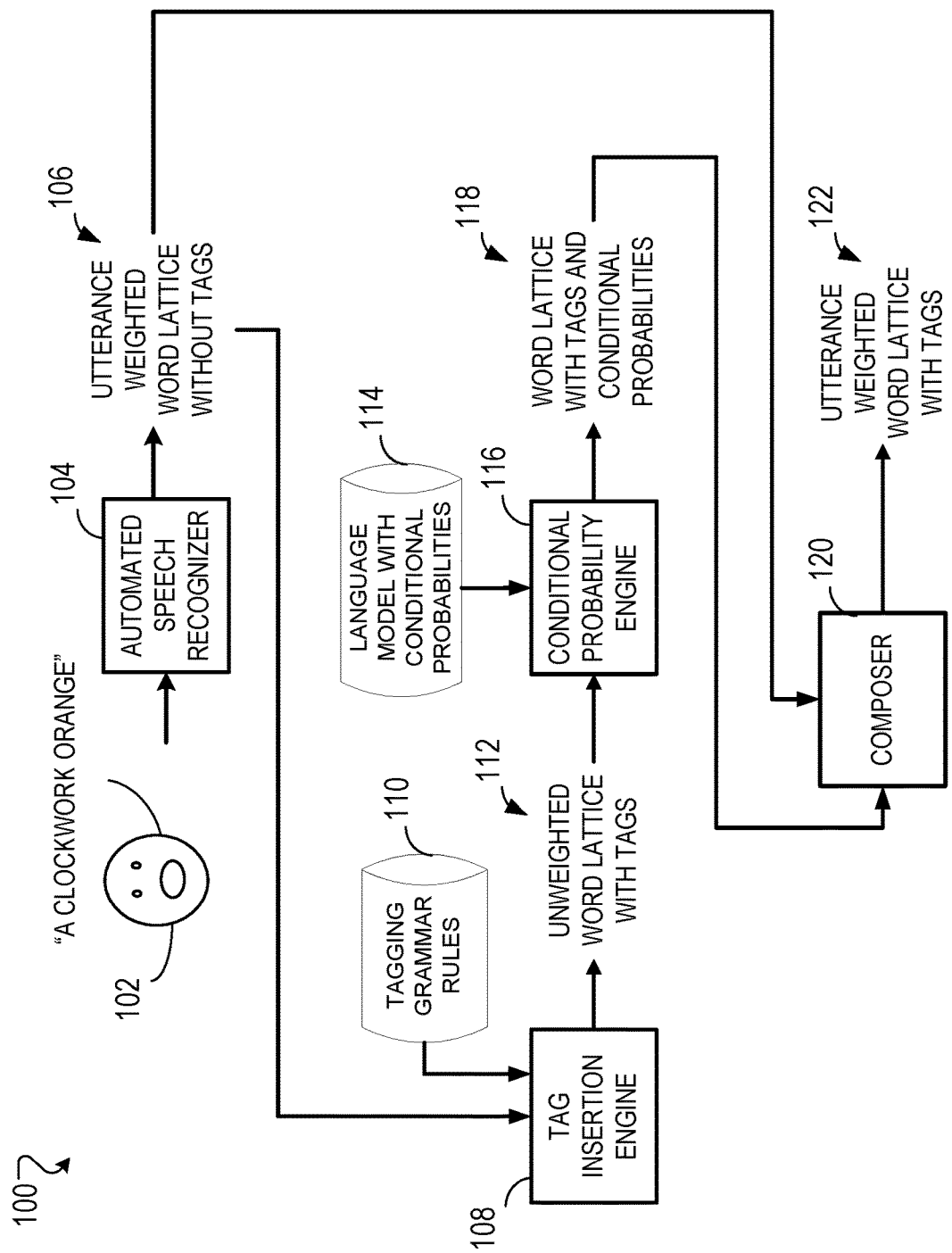
FIG. 1 is a block diagram of an example system for adding semantic tags to a word lattice.

FIG. 1 is a block diagram of an example system 100 for adding semantic tags to a word lattice. A word lattice may be a collection of nodes and arcs that connect the nodes, where nodes correspond to words or semantic tags and paths through the nodes along the arcs correspond to different sentences. A semantic tag may be a decorator for one or more words that indicates a semantic meaning for the one or more words. For example, the text "<colors>" and the text "</colors> may be a semantic tag that indicates any words that appear between correspond to a color, e.g., "<colors> green </colors>" indicating that green is a color. In another example, the text "<vehicles>" and the text "</vehicles> may be a semantic tag that indicates any words that appear between correspond to a vehicle, e.g., "<vehicles> airplane </vehicles>" indicating that airplane refers to a vehicle.

The system 100 for adding semantic tags to a word lattice includes an automated speech recognizer 104, a tag insertion engine 108, a conditional probability engine 116, and a composer 120. The automated speech recognizer 104 may receive an utterance from a user 102 and generate an utterance weighted word lattice without tags 106. For example, the automated speech recognizer 104 may receive mel-frequency cepstral coefficients (MFCCs) for an utterance of "A Clockwork Orange" and output the word lattice shown in FIG. 4 that includes a path for "A Clockwork Orange" and "A New York Orange," among other paths, as further described below.

An utterance weighted word lattice without tags may be a word lattice that indicates probabilities for sequences of words in an utterance. Sequences of words that sound more similar to the utterance and that more frequently appear in a language model may correspond with higher indicated probabilities, and sequences of words that sound more dissimilar to the utterance and that less frequently appear in the language model may correspond with lower indicated probabilities.

The automated speech recognizer 104 may output a word lattice that does not include semantic tags in cases where the recognizer 104 is not trained on text that includes semantic tags. For example, the recognizer 104 may be trained on text from books where the text includes only sentences with words and does not include sentences with both words and semantic tags for the words.

The tag insertion engine 108 may obtain the utterance weighted word lattice without tags 106 and obtain the tagging grammar rules 110, and provide an unweighted word lattice with tags 112. For example, as further described below, the tag insertion engine 108 may obtain the utterance weighted word lattice without tags shown in FIG. 4, obtain the tagging grammar rules 110 in the form of the transducer for inserting entity tags into a word lattice shown in FIG. 3, and provide the unweighted word lattice with tags shown in FIG. 5.

The unweighted word lattice with tags 112 may be a word lattice with the same words as those that appear in the utterance weighted word lattice without tags 106, but without weights on arcs between nodes and with additional nodes inserted for the various ways that the words may be semantically tagged. For example, the unweighted word lattice with tags shown in FIG. 5 includes all the words in the utterance weighted word lattice shown in FIG. 4, and additionally includes nodes for "<cities>," "</cities>," "<colors>," and "</colors>" and corresponding arcs for the added nodes.

The tagging grammar rules 110 may be rules that describe how words can be semantically tagged. For example, the tagging grammar rules may describe that "Orange" may be tagged with "<colors>" or "<fruits>", or not tagged at all, and "Queen" can be tagged as "<bands>Queen</bands>" or "<governmental_figures>Queen </governmental_figures>," or not tagged at all.

In some implementations, tag insertion engine 108 may obtain the tagging grammar rules 110 in the form of a transducer that represents potential ways to tag words in a grammar, compose the utterance weighted word lattice without tags 106 and the transducer that represents potential ways to tag words in a grammar, and provide the result as the unweighted word lattice with tags 112. For example, the tag insertion engine 108 may compose the weighted word lattice shown in FIG. 4 with the transducer shown in FIG. 3.

The conditional probability engine 116 may obtain the unweighted word lattice with tags 112 and obtain a language model with conditional probabilities 114, and output a word lattice with tags and conditional probabilities 118. For example, the conditional probability engine 116 may obtain the unweighted word lattice with tags 112 shown in FIG. 5, obtain a language model that treats semantic tags and words as text in a sentence and indicates conditional probabilities for next text in a sentence based on previous text in a sentence, and output the word lattice with conditional pseudo-probabilities shown in FIG. 8. The word lattice with tags and conditional probabilities 118 may include paths with weights corresponding to conditional probabilities 118 where the weights are based on how frequently text of a next node appears after a sequence of text previously appears.

In some implementations, the conditional probability engine 116 may output the word lattice with tags and conditional probabilities 118 by composing the unweighted word lattice with tags 112 and the language model with conditional probabilities 114. For example, the conditional probability engine 116 may output the word lattice with tagged sentence probabilities shown in FIG. 8 by composing the unweighted word lattice with tags shown in FIG. 5 and a language model that treats semantic tags and words as text in a sentence and indicates conditional probabilities for next text in a sentence based on previous text in a sentence.

In some implementations, the conditional probability engine 116 may obtain the language model with conditional probabilities 114 from a language model with words and semantic tags that indicates joint probabilities but does not indicate conditional probabilities. For example, the language model with conditional probabilities 114 may be obtained from an initial language model constructed from training on a corpus of text that includes both words and semantic tags, where to reduce the size of the initial language model only joint probabilities are stored and not conditional probabilities. This may be done due to storage efficiency and the convenience of using existing language model infrastructures to train and test. In the example, the conditional probability engine 116 may determine marginal probabilities for the given input word lattice from the joint probabilities stored in the initial language model, and then determine the conditional probabilities 114 for the given input word lattice by composing the joint probabilities and the inverse of the marginal probabilities.

In some implementations, the conditional probability engine 116 may additionally use beam pruning and max-normalization when obtaining the language model with conditional probabilities 114. For example, the conditional probability engine 116 may remove paths in the language model with conditional probabilities that are more than a threshold cost greater than a path with a least cost. In another example, the conditional probability engine 116 may normalize the weight of paths in the language model with conditional probabilities so that a cost of a path with a lowest cost is the same as a cost of a corresponding path in the utterance weighted word lattice without semantic tags.

In another implementation, the language model with conditional probabilities 114 may be obtained from other approaches. For example, the system 100 may train a neural network with a corpus of text that includes words and semantic tags for the words and have the neural network output the language model with conditional probabilities 114.

The composer 120 may obtain the word lattice with tags and conditional probabilities 118 and the utterance weighted word lattice without tags 106 and output an utterance weighted word lattice with tags 122. For example, the composer 120 may obtain the word lattice with conditional pseudo-probabilities shown in FIG. 8 and the utterance weighted word lattice without tags 106 shown in FIG. 4, and output the result as the weighted word lattice with tags 122 show in FIG. 9.

The utterance weighted word lattice with tags 122 may be a word lattice that includes paths for representations of a sentence with different words and different semantic tags for the words, where the paths indicate a probability that the path is correct based at least on the utterance and how frequently the sequences of words occur with the semantic tags. For example, an utterance weighted word lattice with tags 112 may be the word lattice with tagged sentence probabilities shown in FIG. 9.

Obtaining the utterance weighted word lattice with tags 122 may be advantageous as speech recognition hypotheses may be rescored based on tags to result in more accurate transcriptions. For example, if an utterance including a city is expected, then the costs of paths without a tag of "<cities>" may increase relative to costs of paths with a tag of "<cities>." In another example, the tags in the lattice 122 may be used by downstream clients. For example, the tags may indicate specific trigger commands in a vocabulary of a downstream client and the downstream client may use the tags to identify the specific trigger commands. Additionally, obtaining the lattice 122 by, as described above, starting with a very large model or annotated training corpus and scaling down to an arbitrarily small size may provide fast tagging speed that is practical for real-time speech recognition.

Figure 2:
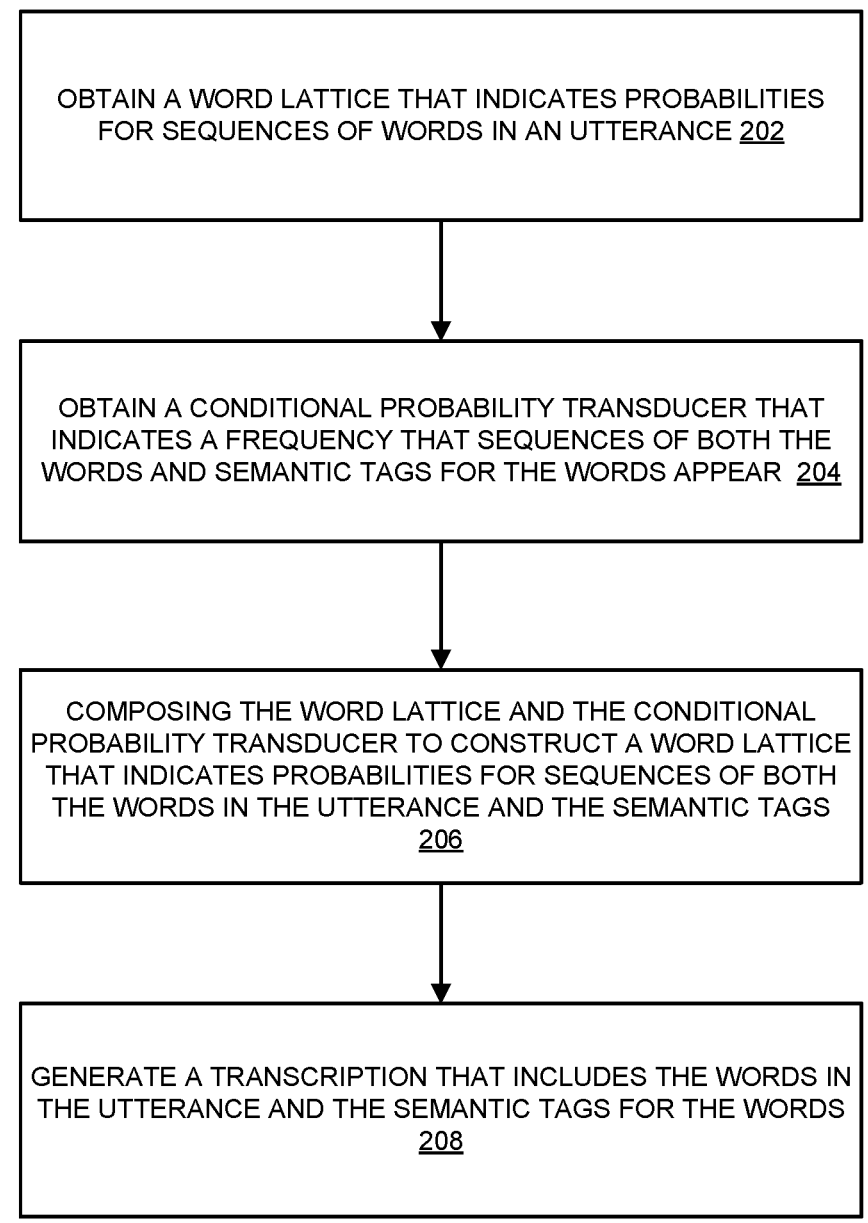
FIG. 2 is a flowchart of an example process for adding semantic tags to a word lattice

FIG. 2 is a flowchart of an example process 200 for adding semantic tags to a word lattice. The following describes the process 200 as being performed by components of the system 100 that are described with reference to FIG. 1. However, the process 200 may be performed by other systems or system configurations.

The process 200 includes obtaining, from an automated speech recognizer, a word lattice that indicates probabilities for sequences of words in an utterance (202). For example, the tag insertion engine 108 may obtain the utterance weighted word lattice without tags 106 from the automated speech recognizer 104 receiving acoustic features of an utterance "A Clockwork Orange."

In some implementations, obtaining, from an automated speech recognizer, a word lattice that indicates probabilities for sequences of words in an utterance includes providing an utterance to the automated speech recognizer that does not semantically tag words and receiving, from the automated speech recognizer, the word lattice that indicates probabilities for sequences of words in an utterance, where the word lattice does not include semantic tags for words in the word lattice. For example, the automated speech recognizer 104 may be trained on a corpus of text that did not include semantic tags so the language model of the automated speech recognizer 104 is unable to identify potential semantic tags for words in an utterance.

The process 200 includes obtaining a conditional probability transducer that indicates a frequency that sequences of both the words and semantic tags for the words appear (204). For example, the conditional probability engine may obtain a language model with semantic tags and conditional probabilities 114.

In some implementations, obtaining a conditional probability transducer that indicates a frequency that sequences of both the words and semantic tags for the words appear includes obtaining the conditional probability transducer from a language model that is trained on a corpus of text that includes sequences of words and semantic tags for the words. For example, the system 100 may generate the language model with conditional probabilities 114 from training a neural network with a corpus of text that includes sequences of words with semantic tags for the words.

In some implementations, obtaining a conditional probability transducer that indicates a frequency that sequences of both the words and semantic tags for the words appear includes obtaining joint probabilities for sequences of the words and the semantic tags for the words, obtaining marginal probabilities for sequences of the words, and obtaining the condition probability transducer from the joint probabilities and the marginal probabilities. For example, the system 100 may obtain the word lattice expanded with candidate entity tags and joint probabilities shown in FIG. 6, obtain the word lattice with marginal pseudo-probabilities shown in FIG. 7 from the word lattice shown in FIG. 6, and obtain the word lattice with conditional pseudo-probabilities shown in FIG. 8 from composing the word lattice shown in FIG. 6 and the inverse of the word lattice shown in FIG. 7.

The process 200 includes composing the word lattice and the conditional probability transducer to construct a word lattice that indicates probabilities for sequences of both the words in the utterance and the semantic tags for the words (206). For example, the composer 120 may compose the utterance weighted word lattice without tags 106 shown in FIG. 4 and the word lattice with tags and conditional probabilities 118 shown in FIG. 8 to construct the word lattice shown in FIG. 9.

The process 200 includes using the word lattice that indicates probabilities for sequences of both the words in the utterance and the semantic tags for the words to generate a transcription that includes the words in the utterance and the semantic tags for the words (208). For example, the system 100 may generate a single transcription of "A Clockwork Orange" from the path in the word lattice shown in FIG. 9 that indicates a cost that is lower than the cost of other paths in the word lattice.

In some implementations, using the word lattice that indicates probabilities for sequences of both the words in the utterance and the semantic tags for the words to generate a transcription that includes the words in the utterance and the semantic tags for the words includes biasing the probability of a path in the word lattice based at least on a semantic tag in the path, selecting the path in the word lattice from among other paths in the word lattice based at least on the biased probability of the path, and generating a transcription from the selected path in the word lattice. For example, if the system 100 is expecting an utterance that includes a term for a city, the system 100 may one or more of decrease a cost of paths that include a node for "<cities>", e.g., decrease costs for the path for "A <cities> New York </cities> Orange" and the path for "A <cities> New York </cities> <colors> Orange </colors>," and increase a cost of paths that do not include a node for "<cities>," e.g., increase costs for the path for "A Clockwork Orange" and the path for "A Clockwork <colors> Orange </colors>."

A detailed example of system 100 follows where the semantic tags added are entity tags.

Training the Tagging Model

A language model that models a joint distribution $P_T(s, t)$ may be trained, where the subscript T denotes a language model trained on data with entity tags, s is a sentence, and t represents a particular way of tagging.s. The language model may be trained by starting with a pre-existing very large (e.g., over 1 Terabyte) discriminative NED model, which can be thought of as a black box that can annotate large volumes of training data in an offline, batched manner. Additionally or alternatively a large corpus annotated through other means, such as human-introduced tags, may be used.

The NED model may support more than 10,000 semantic collections, or classes, organized into hierarchical relationships with multiple inheritance. For the purpose of building a fast and compact tagger, the collections may be reduced to a flat set, e.g., 200, 300, 1000, or some other number, of classes by agglomerating sibling collections into their parent. Agglomeration may be based on (1) cosine similarity between members of a collection and the entire collection using a context window of three tokens to the left and right; (2) in-class entropy, dropping collections heavily dominated by a few members; (3) frequency over an annotated sample, or some other approach.

A corpus of text, e.g., a corpus of two hundred billion search and voice command queries, may be annotated using the NED model. For example, semantic collection annotations may be mapped to the three classes, and opening and closing entity tags may be inserted around entities, e.g.: "how tall is <artists> taylor swift </artists>?"

The entity tags may be treated as regular words, and a Katz backoff n-gram language model (LM) trained on the annotated corpus. Before training, numeric entities such as telephone numbers and currencies may be aggregated into non-terminal symbols for generality. The LM may be entropy pruned to a target size of one hundred million n-grams and stored as an FST, with transition costs on each arc representing negative log probabilities.

Lattice Tagging Algorithm

While using $P_T(s, t)$ in a first-pass speech recognizer may automatically generate a word lattice with semantic tags in it, this may be impractical as non-determinism in $P_T(s, t)$ may introduce search errors, word accuracy reduction, and higher CPU utilization. Instead, tagging may be performed as a post-processing step on an input lattice L.

The essence of the lattice tagging algorithm may be to use Bayes' rule to derive the conditional distribution $P_T(t|s)$ from the joint $P_T(s, t)$ accomplished by dividing the joint probability by the marginal probability:

$$P_T(t|s) = \frac{P_T(s, t)}{P_T(s)} \quad (1)$$

In Equation (1), each of the above terms is computed for an input lattice using FSTs. The input includes input lattice L, an acyclic, weighted automaton over words, a transducer C to insert entity tags into L, and the joint distribution $P_T(s, t)$.

L may be first determinized (with pruning to control the size of the output) and minimized. For example, if no path can be rescored in the second pass by ≥δ weight, all hypotheses that are ≥δ weight behind a best path may be pruned:

$$L_{Opt} \leftarrow \min(det_{weight=\delta}(L)) \qquad (2)$$

Inserting Tags into the Lattice

To insert entity tags into $L_{Opt}$, a grammatical "constrainer," C, may be built. C may be an unweighted transducer whose input side accepts all untagged sentences and output side accepts optionally tagged sentences, subject to: (1) balanced open-close tags; (2) no nested tags; (3) text inside the tags corresponds to class instances observed in training data.

Figure 3:
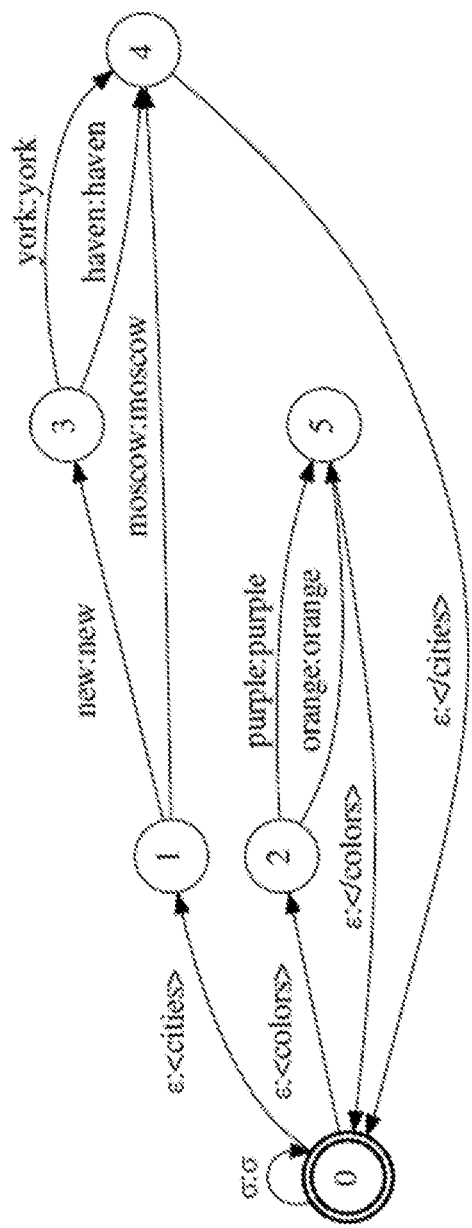
FIG. 3 is a diagram of an example transducer for inserting entity tags into a word lattice.

FIG. 3 is a diagram of an example transducer for inserting entity tags into a word lattice. As shown in FIG. 3, the transducer includes a various nodes with arcs between the nodes that indicate pairs of words, tags, or wildcards. C may be constructed with a single master state that loops on any word in the language (represented by a wildcard label, σ) and on any observed instance of a permitted class, surrounded by open/close tags. Constraining the lattice in this manner may not only discard bad taggings, it may greatly reduce search space and give finer control over latency. Composing unweighted $L_{Opt}$ with C may yield an unweighted lattice representing all possible taggings of L:

$$L_T \leftarrow rm\text{weight}(L_{Opt}) \circ C \qquad (3)$$

Figure 4:
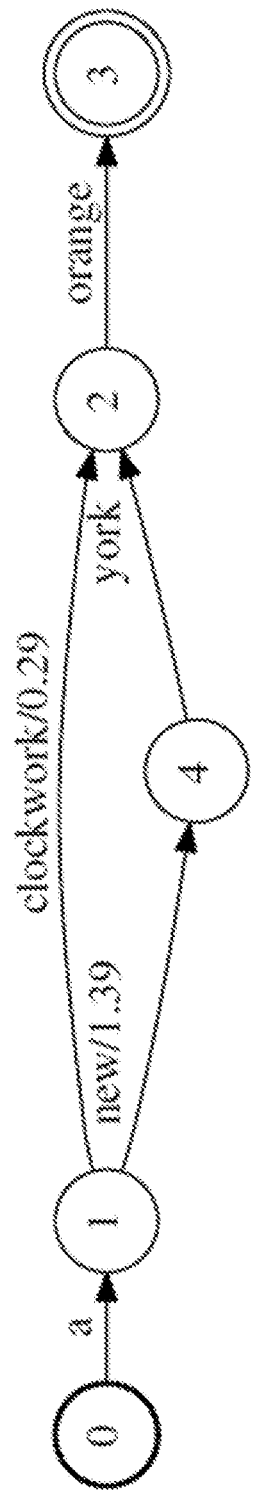
FIG. 4 is a diagram of an example word lattice for an utterance.
Figure 5:
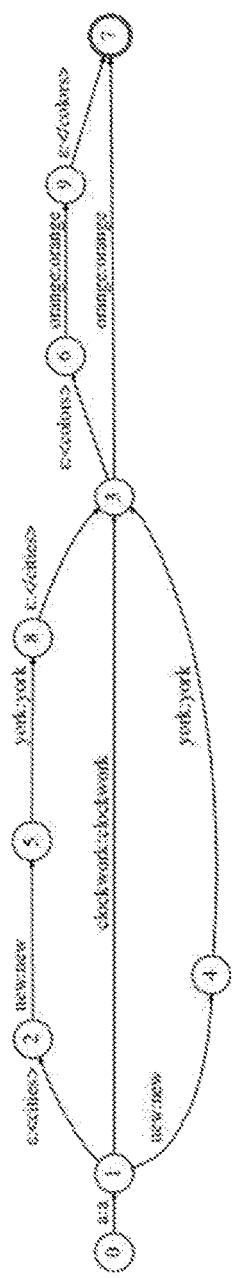
FIG. 5 is a diagram of an example word lattice expanded with candidate entity tags.

FIG. 4 is a diagram of an example word lattice for an utterance. The word lattice describes likelihoods that candidate transcriptions are correct for an utterance of "a clockwork orange." FIG. 5 is a diagram of an example word lattice expanded with candidate entity tags. The word lattice describes the various ways that the words in the $L_{Opt}$ may be tagged. Arc weights may be log probabilities and no weight may be represented by a probability of one.

Computing Joint Probability

Probabilities from the joint distribution $P_T(s, t)$ may be by composed with the unweighted lattice that represents all possible taggings of L.

$$L_J(s,t) \leftarrow L_T \circ P_T(s,t) \qquad (4)$$

$P_T$ may be a back-off LM and contain failure transitions denoted by the label ø that are followed when there is no match at the current FST state. A composition algorithm may be used that supports this functionality.

Figure 6:
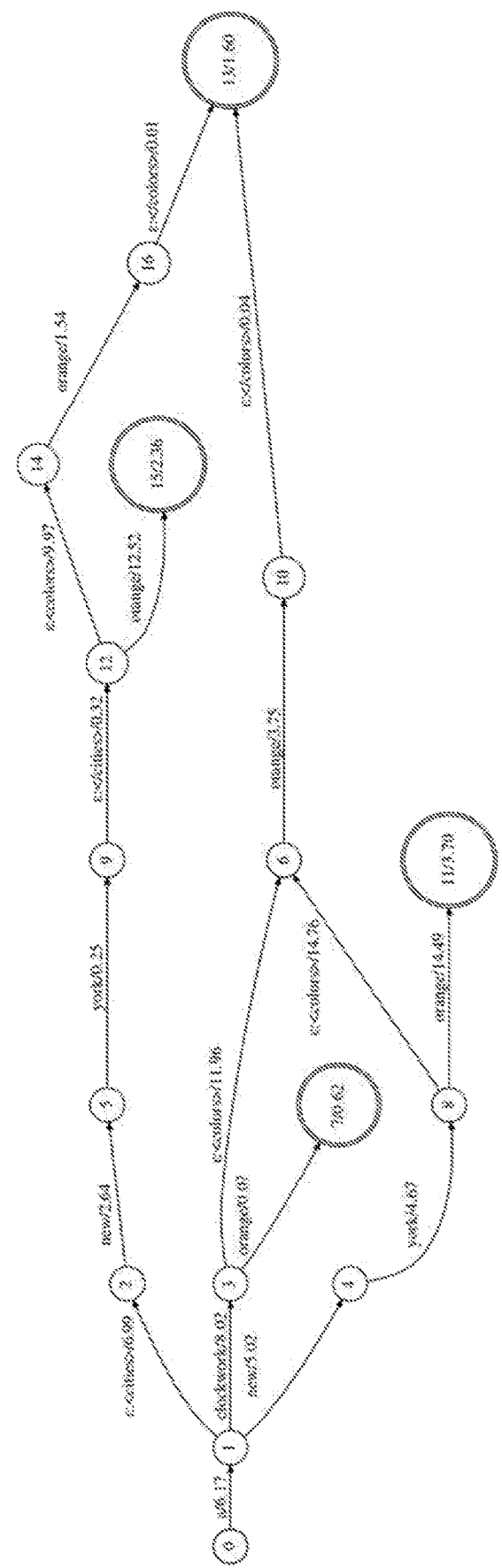
FIG. 6 is a diagram of an example word lattice expanded with candidate entity tags and joint probabilities.

FIG. 6 is a diagram of an example word lattice expanded with candidate entity tags and joint probabilities. The word lattice in FIG. 6 may be $L_J$, an expanded lattice with the joint probabilities. For readability, arcs that have the same input and output label are displayed with only one label, e.g., "a:a" is displayed as "a". The lattice is decorated with all possible taggings and whose arc weights are joint probabilities from $P_T(s, t)$.

Computing the Marginal Probability

The marginal probability, $P_T(s)$ may be computed with $L_J$. Computing $P_T(s)$ precisely from a cyclic automaton such as the entire LM $P_T(s, t)$ may be a non-trivial problem because the twins property. However, the marginal probability may be sufficiently calculated from just the (acyclic) lattice L:

$$P_T(s \in L) = \sum_t P_T(s, t) \qquad (5)$$

To compute $P_T(S \in L)$, entity tags may be removed from the output arcs of $L_J$ by projecting on input, removing epsilons, determinizing, and combining all paths through the same words using the weighted determinization algorithm, which is guaranteed to terminate on acyclic inputs:

$$L_M(s) \leftarrow \min(det_{weight=\delta}(rm\text{eps}(\uparrow L_J))) \qquad (6)$$

Max-Normalization

In the case of ASR, standard probability normalization may be undesirable because the probability of a hypothesis divided among several equi-probable taggings may be unfairly handicapped with respect to a hypothesis with just one tagging during Viterbi decoding. Max-normalization, where probabilities are scaled such that the highest "probability" becomes one may be used to address this handicap. Max-normalization may be enabled by having min and det operators use arc costs in the tropical semiring, where probability addition is replaced with taking the maximum. The computed quantities are no longer true probabilities and may be referred to as pseudo-probabilities. Instead of representing the sum of joint probabilities of all taggings of a sentence, the modified L'M represents joint probability of the best tagging of each sentence:

$$L'_M(s) = \max_t P_T(s, t) \qquad (7)$$

Figure 7:
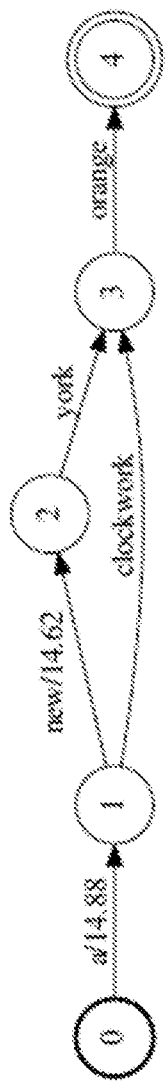
FIG. 7 is a diagram of an example word lattice with marginal pseudo-probabilities.

FIG. 7 is a diagram of an example word lattice L'$_M$ with marginal pseudo-probabilities.

Computing the Conditional Probability

The joint distribution $L_J$ may be divided by the marginal $L_M$ to get the conditional. Division may be performed by inverting arc weights in the denominator and composing the numerator with it:

$$L_C(t|s) \leftarrow \min(det_{wt.=\delta}(inv(L_M(s)^{-1} \circ L_J(s,t)))), \qquad (8)$$

where inv denotes inversion of input and output arc labels and the superscript −1 denotes inverting arc weights. Using max-normalization may normalize by the cost of the best path as computed in (6), giving the best path a conditional pseudo-probability of one. Prune taggings more than δ' beam behind optimal tagging(s) during the determinization step is also performed in (8).

Figure 8:
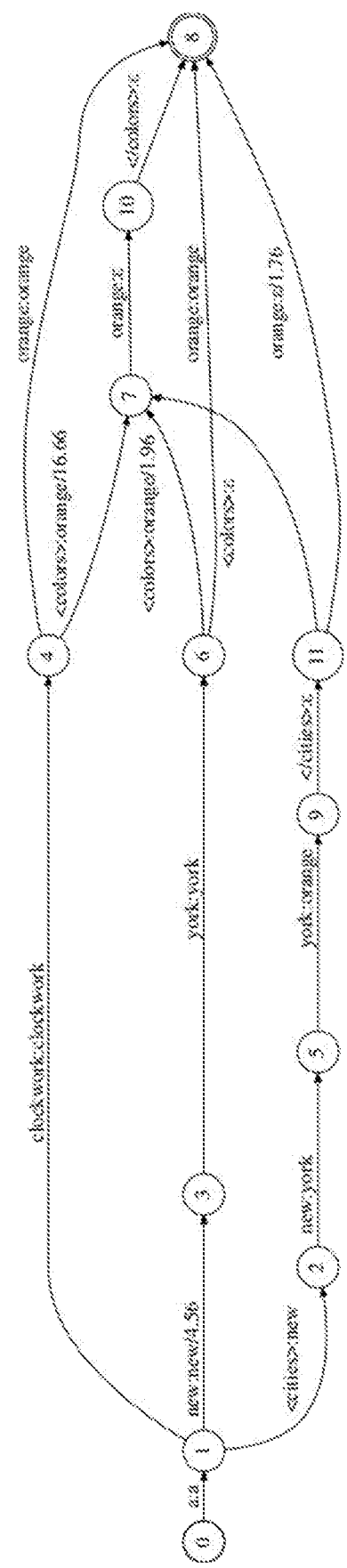
FIG. 8 is a diagram of an example word lattice with conditional pseudo-probabilities.

FIG. 8 is a diagram of an example word lattice with conditional pseudo-probabilities. The word lattice may be $L_C$ with conditional pseudo-probabilities. As shown in FIG. 8, the best tagging of "a new york orange" is "a <cities> new york </cities> <color> orange </color>", while the best tagging of "a clockwork orange" has no tags, as there are no movie title tags in the example constraining grammar. The best tagging of any sentence has a log cost of 0.

Applying the Conditional Probability

The conditional distribution may be applied to the original (optimized) word lattice:

$$L_{Combined} \leftarrow L_C(t|s) \circ L_{Opt} \qquad (9).$$

$L_{combined}$ may contain the original weights of L modified by added tags.

Figure 9:
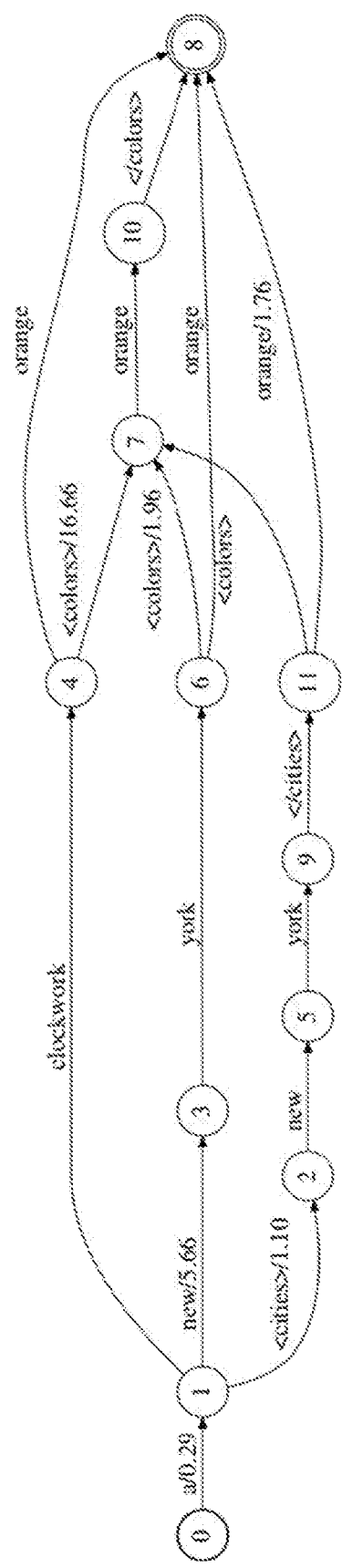
FIG. 9 is a diagram of an example word lattice with tagged sentence probabilities.

FIG. 9 is a diagram of an example word lattice with tagged sentence probabilities. The word lattice may be $L_C$ with tagged sentence probabilities, projected on the input side. The best path through any word sequence has the same probability as in the original lattice L as shown in FIG. 4.

When using max-normalization, paths with optimal taggings may keep the original path probability in the lattice, preserving their n-best order.

In speech recognition, weights in the original lattice L may encode the probability $P_{1st}(s)$, i.e., the probability assigned to any path s by the first-pass LM, so $L_{Combined}$ is equivalent to:

$$L_{Combined} = P_T(t|s) \cdot P_{1st}(s) \quad (10)$$

$P_{1st}(s)$ may be a more efficient sentence-level model than $P_T(s)$ because it does not contain tags. Thus a more accurate sentence-level model may be with best available tagging knowledge. As discussed above, obtaining the word lattice with tagged sentence probabilities may be advantageous as speech recognition hypotheses may be rescored based on tags to result in more accurate transcriptions. For example, if an utterance including a city is expected, then the costs of paths without a tag of "<cities>" may increase relative to costs of paths with a tag of "<cities>." In another example, the tags may be used by downstream clients. For example, the tags may indicate specific trigger commands in a vocabulary of a downstream client and the downstream client may use the tags to identify the specific trigger commands. Additionally, obtaining the lattice, as described above, starting with a very large model or annotated training corpus and scaling down to an arbitrarily small size may provide fast tagging speed that is practical for real-time speech recognition.

Figure 10:
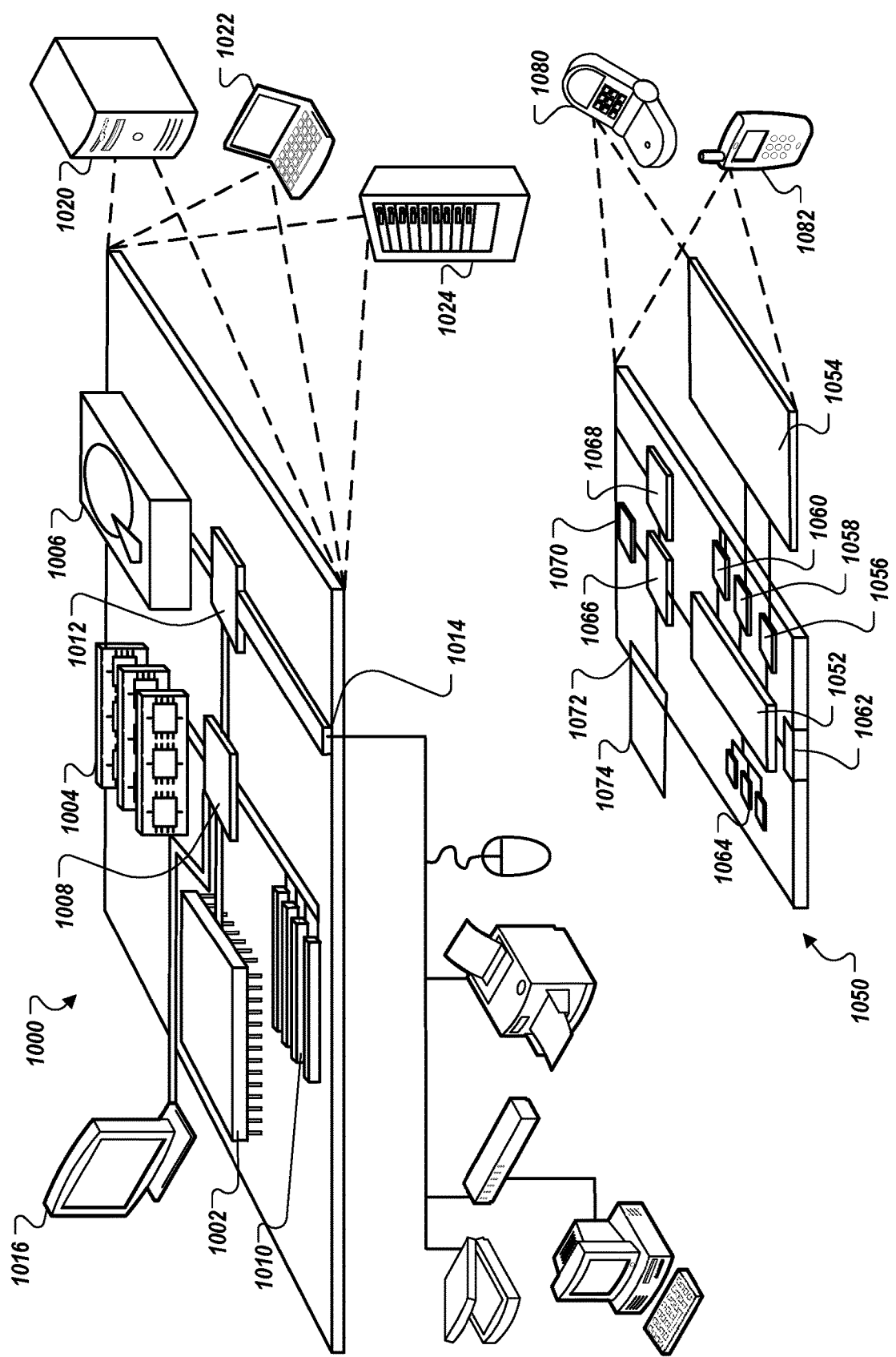
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
    obtaining, from an automated speech recognizer, an utterance-weighted word lattice that indicates probabilities for sequences of words in an utterance;
    obtaining a conditional probability transducer that indicates a frequency that sequences of both the words and semantic tags for the words appear;
    composing the utterance-weighted word lattice and the conditional probability transducer to construct an updated word lattice that (i) includes additional nodes that are not included in the utterance-weighted word lattice, (ii) includes semantic tags represented by arcs both in the updated word lattice and of the additional nodes, (iii) includes words represented by other arcs both in the updated word lattice and of the additional nodes, and (iv) indicates probabilities for sequences of both the words and the semantic tags that are included; and
    using the updated word lattice to generate a transcription that includes the words in the utterance and the semantic tags.

2. The method of claim 1, wherein obtaining, from an automated speech recognizer, an utterance-weighted word lattice that indicates probabilities for sequences of words in an utterance comprises:
    providing an utterance to the automated speech recognizer that does not semantically tag words; and
    receiving, from the automated speech recognizer, the utterance-weighted word lattice that indicates probabilities for sequences of words in an utterance, where the word lattice does not include semantic tags as words.

3. The method of claim 1, wherein obtaining a conditional probability transducer that indicates a frequency that sequences of both the words and semantic tags for the words appear comprises:
    obtaining the conditional probability transducer from a language model that is trained on a corpus of text that includes sequences of words and semantic tags for the words.

4. The method of claim 1, wherein obtaining a conditional probability transducer that indicates a frequency that sequences of both the words and semantic tags for the words appear comprises:
    obtaining joint probabilities for sequences of the words and the semantic tags for the words;
    obtaining marginal probabilities for sequences of the words; and
    obtaining the condition probability transducer from the joint probabilities and the marginal probabilities.

5. The method of claim 4, wherein obtaining joint probabilities for sequences of the words and the semantic tags for the words comprises:
    obtaining joint probabilities from a language model that includes joint probabilities corresponding to a corpus of text that includes sequences of words and semantic tags for the words.

6. The method of claim 4, wherein obtaining marginal probabilities for sequences of the words and the semantic tags for the words comprises:
    obtaining marginal probabilities from the joint probabilities.

7. The method of claim 4, wherein obtaining marginal probabilities from the joint probabilities comprises:
    performing max-normalization so that the marginal probabilities represent pseudo-probabilities based on best tagging for a sentence.

8. The method of claim 4, wherein obtaining the condition probability transducer from the joint probabilities and the marginal probabilities comprises:
    composing the joint probability and the inverse of the marginal probability.

9. The method of claim 4, wherein obtaining the condition probability transducer from the joint probabilities and the marginal probabilities comprises:
    performing beam pruning to remove paths that do not satisfy a threshold conditional probability.

10. The method of claim 1, wherein using the updated word lattice comprises:
    biasing the probability of a path in the updated word lattice based at least on a semantic tag in the path;
    selecting the path in the word lattice from among other paths in the updated word lattice based at least on the biased probability of the path; and
    generating a transcription from the selected path in the updated word lattice.

11. The method of claim 1, wherein pairs of the semantic tags included in the updated word lattice indicate sequences of words represented by the arcs between the arcs represented by the pairs of semantic tags correspond to semantic meanings indicated by the pairs of semantic tags.

12. A system comprising:
    one or more computers and one or more storage devices storing instructions that are operable, when executed by the one or more computers, to cause the one or more computers to perform operations comprising:
    obtaining, from an automated speech recognizer, an utterance-weighted word lattice that indicates probabilities for sequences of words in an utterance;
    obtaining a conditional probability transducer that indicates a frequency that sequences of both the words and semantic tags for the words appear;
    composing the utterance-weighted word lattice and the conditional probability transducer to construct an updated word lattice that (i) includes additional nodes that are not included in the utterance-weighted word lattice, (ii) includes semantic tags represented by arcs both in the updated word lattice and of the additional nodes, (iii) includes words represented by other arcs both in the updated word lattice and of the additional nodes, and (iv) indicates probabilities for sequences of both the words and the semantic tags that are included; and using the updated word lattice to generate a transcription that includes the words in the utterance and the semantic tags.

13. The system of claim 12, wherein obtaining, from an automated speech recognizer, an utterance-weighted word lattice that indicates probabilities for sequences of words in an utterance comprises:
   providing an utterance to the automated speech recognizer that does not semantically tag words; and
   receiving, from the automated speech recognizer, the utterance-weighted word lattice that indicates probabilities for sequences of words in an utterance, where the word lattice does not include semantic tags as words.

14. The system of claim 12, wherein obtaining a conditional probability transducer that indicates a frequency that sequences of both the words and semantic tags for the words appear comprises:
   obtaining the conditional probability transducer from a language model that is trained on a corpus of text that includes sequences of words and semantic tags for the words.

15. The system of claim 12, wherein obtaining a conditional probability transducer that indicates a frequency that sequences of both the words and semantic tags for the words appear comprises:
   obtaining joint probabilities for sequences of the words and the semantic tags for the words;
   obtaining marginal probabilities for sequences of the words; and
   obtaining the condition probability transducer from the joint probabilities and the marginal probabilities.

16. The system of claim 15, wherein obtaining joint probabilities for sequences of the words and the semantic tags for the words comprises:
   obtaining joint probabilities from a language model that includes joint probabilities corresponding to a corpus of text that includes sequences of words and semantic tags for the words.

17. The system of claim 15, wherein obtaining marginal probabilities for sequences of the words and the semantic tags for the words comprises:
   obtaining marginal probabilities from the joint probabilities.

18. The system of claim 15, wherein obtaining marginal probabilities from the joint probabilities comprises:
   performing max-normalization so that the marginal probabilities represent pseudo-probabilities based on best tagging for a sentence.

19. A non-transitory computer-readable storage device encoded with a computer program, the program comprising instructions that when executed by one or more computers cause the one or more computers to perform operations comprising:
   obtaining, from an automated speech recognizer, an utterance-weighted word lattice that indicates probabilities for sequences of words in an utterance;
   obtaining a conditional probability transducer that indicates a frequency that sequences of both the words and semantic tags for the words appear;
   composing the utterance-weighted word lattice and the conditional probability transducer to construct an updated word lattice that (i) includes additional nodes that are not included in the utterance-weighted word lattice, (ii) includes semantic tags represented by arcs both in the updated word lattice and of the additional nodes, (iii) includes words represented by other arcs both in the updated word lattice and of the additional nodes, and (iv) indicates probabilities for sequences of both the words and the semantic tags that are included; and
   using the updated word lattice to generate a transcription that includes the words in the utterance and the semantic tags.

* * * * *